United States Patent

[11] 3,625,534

| [72] | Inventors | William J. Harrison<br>Guelph;<br>Dennis G. Harvey, Ancaster, Ontario, both of Canada |
|---|---|---|
| [21] | Appl. No. | 44,946 |
| [22] | Filed | June 10, 1970 |
| [45] | Patented | Dec. 7, 1971 |
| [73] | Assignee | Allis-Chalmers Manufacturing Company<br>Milwaukee, Wis. |

[54] LIFT LINKAGE FOR A LOW-LIFT TRUCK
5 Claims, 2 Drawing Figs.

| [52] | U.S. Cl. | 280/43.12 |
|---|---|---|
| [51] | Int. Cl. | B62d 21/18 |
| [50] | Field of Search | 280/43.12, 43.23; 214/512 |

[56] References Cited
UNITED STATES PATENTS

| 2,598,151 | 5/1952 | Warshaw | 280/43.12 |
|---|---|---|---|
| 3,036,651 | 5/1962 | Paul | 280/43.12 |
| 3,392,858 | 7/1968 | Fernstrom | 280/43.12 |

Primary Examiner—Benjamin Hersh
Assistant Examiner—Robert R. Song
Attorneys—Charles L. Schwab, Robert B. Benson and Kenneth C. McKivett ABSTRACT: The elevating platform of a low-lift-type lift truck is connected to the frame of the truck through a pair of parallel links which are spaced vertically and longitudinally from one another. The lower pair of links are disposed below a battery support and the upper pair of links are disposed forwardly of the battery. A single upstanding hydraulic jack is employed to raise and lower the load carrying platform through a connection with the lower pair of links.

PATENTED DEC 7 1971 3,625,534

Inventors
William J. Harrison
Dennis G. Harvey

By Charles L. Schwab
Attorney

LIFT LINKAGE FOR A LOW-LIFT TRUCK

This invention relates to a low-lift lift truck which is often referred to as a walkie truck. In such a truck the elevating platform is movable from a collapsed or lowered height of about 4 inches to a raised height of about 8 inches. Typically, the front of the truck is supported by a steering head powered by an electric motor. The operator usually walks at the front of the truck and controls the truck through a vertically swinging control handle. Some walkie trucks are designed to permit the operator to ride on the truck if he chooses to do so. Walkie trucks are powered by an electric battery customarily carried between the steering head and the elevating platform. Heretofore, various linkages have been proposed for raising and lowering the elevating platform with varying degrees of success. The present invention provides a lift linkage and interconnection between the elevating platform and truck frame which affords increased lift height without increasing overall truck dimensions or adversely affecting truck stability.

It is an object of the present invention to provide an improved linkage for interconnecting the elevating platform and the main frame of a low-lift truck which affords improved lift height and excellent truck stability.

It is a further object of this invention to provide a parallel linkage interconnection between the elevating platform and the main frame of the lift truck wherein the upper parallel link is disposed ahead of the battery and the lower parallel link is disposed directly below the battery.

It is a further object of this invention to provide an improved interconnection between the elevating platform of a low-lift lift truck and the main frame wherein the hydraulic jack for operating the linkage is disposed vertically ahead of the battery.

These and other objects and advantages of the present invention will be apparent when the following description is read in conjunction with the drawings in which.

Figure 1:
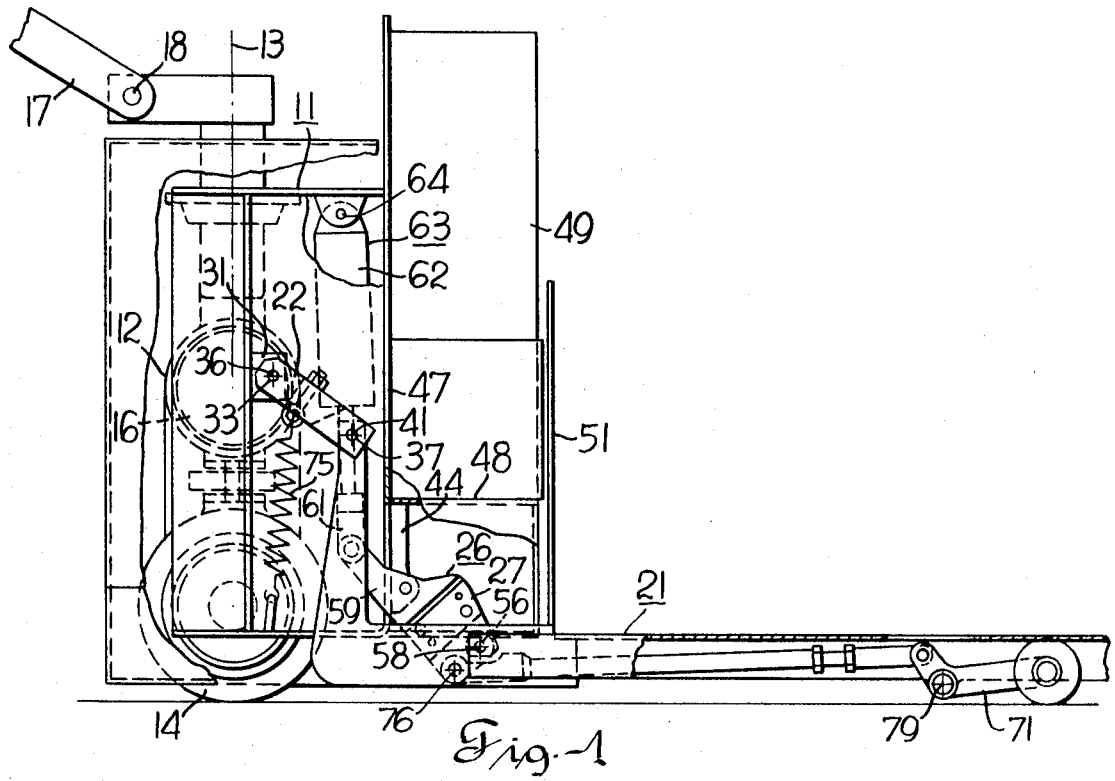
FIG. 1 is a side view of a truck incorporating the present invention with parts broken away for illustration purposes.
Figure 2:
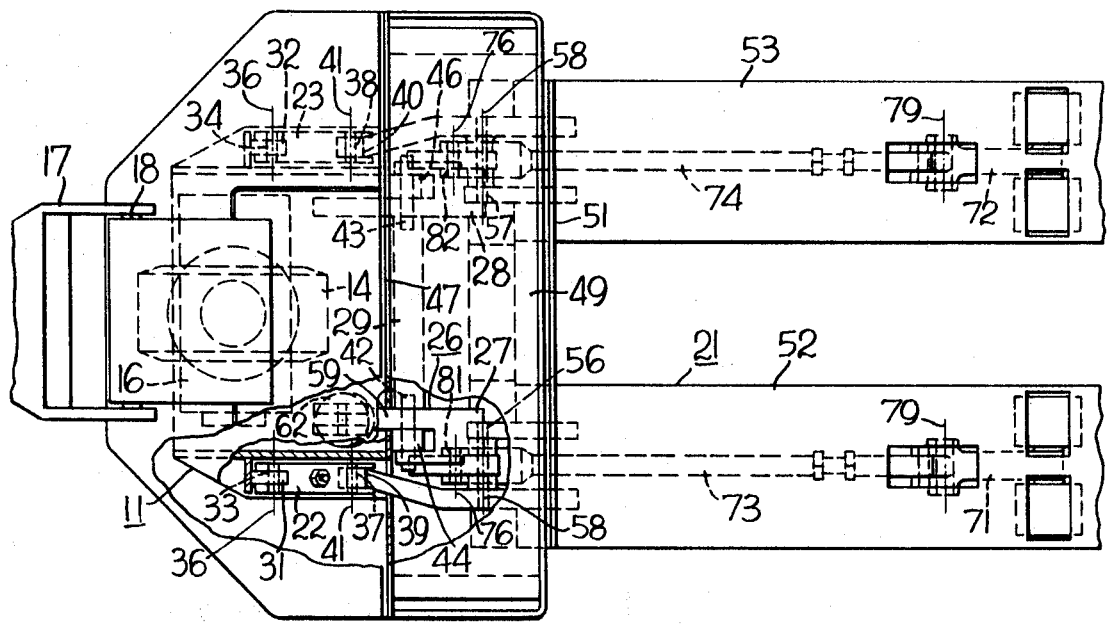
FIG. 2 is a top view of the truck shown in FIG. 1.

Referring to the drawings a main frame 11 is supported by a steering head 12 pivotally connected thereto on a vertical pivot axis 13. The steering head 12 includes a supporting drive wheel 14 which is driven by an electric motor 16. The steering head 12 is steered relative to the frame 11 by a manually operated control handle 17 which is pivotally connected to the upper part of the steering head 12 by a pin 18. Conventional controls, no shown, are also located on the steer handle permitting the operator to control power to the drive wheel 14 and operate braking mechanism, not shown.

The frame 11 is pivotally connected to an elevating platform 21 by parallel linkage including a pair of upper links 22, 23 and a lower linkage assembly 26. The lower linkage assembly, which is vertically and longitudinally spaced from links 22, 23, includes a pair of links 27, 28 rigidly interconnected by welding to opposite ends of transverse bar member 29. The upper links 22, 23 are pivotally connected at their forward ends to brackets 31, 32 on frame 11 by a pair of pins 33, 34 on a transverse axis 36. The rear ends of the links 22, 23 are pivotally connected by pins 37, 38 to upstanding legs 39, 40 of the platform 21 for relative movement about a transverse axis 41. The lower links 27, 28 have their front ends pivotally connected to brackets 44, 46 on transverse vertical wall 47 of the main frame 11 by pins 42, 43. The front ends of the links 27, 28 are pivotally connected by pins 56, 57 to the elevating platform 21 on a transverse pivot axis 58. Link 27 has a forwardly extending arm 59 to which is connected a rod 61 of a hydraulic jack 62. The cylinder 63 of the hydraulic jack is connected to the frame 11 by a suitable pin 64.

A horizontal support wall 48 extends forwardly from transverse wall 47 to provide a battery support portion of the frame 11 on which a suitable electric storage battery 49 is mounted. A load-positioning wall 51 extends transversely along the front of the battery support portion of the truck and is secured as by welding to a pair of forks 52, 53 constituting a part of the lifting platform 21. The lower links 27, 28 are pivotally connected on a transverse pivot axis 76 to push rods 73, 74, respectively, by pins 81, 82. The rear ends of the push rods 73, 74 are pivotally connected to wheel support arms 71, 72 which in turn are pivotally connected to forks 52, 53 on transverse axis 79. When the upstanding jack 62 is expanded, the links 27, 28 are pivoted counterclockwise as viewed in FIG. 1, thereby raising the platform 21 through the connection of pins 56, 57 with the platform and through the lowering of wheel supporting arms 71, 72 by push rods 73, 74. When the jack is contracted, the lowering of the platform 21 is assisted by a tension spring 75 connected at its upper end to link 22 and at its lower end to frame 11.

The linkage arrangement provided in this low-lift lift truck allows the elevating platform to be raised higher than usual. This is achieved in part through providing adequate space for links 27, 28 directly below battery support portion 48 and by placing the upper links 22, 23 forwardly of the battery 49. Also the desired stability between the frame 11 and the elevating platform 21 is obtained through adequate vertical spacing between the upper and lower links. As is apparent from the drawings, these desirable features have been accomplished without adversely increasing the overall length of the truck.

The embodiments of the invention in which an exclusive property or privilege is claimed are defined as follows:

1. In a lift truck
    a main frame, including a battery support portion
    a steering head pivotally connected to said main frame in front of said battery support portion for steering movement on a vertical axis and including a support wheel and a control handle,
    an elevating platform having an upstanding structure at its front end, forwardly of said battery support portion,
    wheel-supporting arms pivotally connected to the rear end of said platform,
    wheels on said arms,
    connecting means securing the front end of said platform to said main frame including
        a first pair of links pivotally connecting the upper end of said upstanding structure to said main frame, forwardly of said battery support portion, and
        a linkage assembly having
            a second pair of links disposed below said battery support portion and pivotally connecting said main frame and said elevating platform, said second pair of links being spaced below and parallel to said first pair of links and
            a member rigidly interconnecting said second pair of links,
    a pair of longitudinally extending rods on the lower said of said platform pivotally connected at their front ends to said second pair of links, respectively, and pivotally connected at their rear ends of said rods to said arms, respectively, and
    an upstanding hydraulic jack having its upper end pivotally connected to said frame and its lower end pivotally connected to said assembly, said elevating platform being raised relative to said frame upon expansion of said jack, 2. The invention of claim 1 wherein one of said second pair of links has a forward extension and said lower end of said jack is connected to said extension.

3. The invention of claim 1 wherein said first pair of links are pivotally connected to said main frame on a first transverse axis and extend rearwardly therefrom, said second pair of links are pivotally connected to said frame on a second transverse axis spaced rearwardly and below said first axis and extend rearwardly therefrom, said first pair of links are pivotally connected to said upstanding structure on a third transverse axis and said second pair of links are pivotally connected to said elevating platform on a fourth transverse axis, said first and second pairs of links and their pivot connections with said frame and elevating platform establishing a parallel linkage.

4. The invention of claim 3 wherein said vertical axis is in the longitudinal vertical plane of the truck, said jack is disposed to one transverse side of said plane and has its lower end connected to a forwardly extending portion of said linkage assembly.

5. The invention of claim 5 including a tension spring connected at one end to one of said links and at its other end to said frame whereby said platform is biased toward its lowered position.

* * * * *

PO-1050
(5/69)

UNITED STATES PATENT OFFICE
CERTIFICATE OF CORRECTION

Patent No. 3,625,534     Dated December 7, 1971

Inventor(s) William J. Harrison and Dennis G. Harvey

It is certified that error appears in the above-identified patent and that said Letters Patent are hereby corrected as shown below:

Column 2, line 49, "said" should have been -- side --; line 57, the comma (,) after "jack" should have been -- a period (.) --. Column 4, line 1, "5" (second occurrence) should have been -- 4 --.

Signed and sealed this 30th day of May 1972.

(SEAL)
Attest:

EDWARD M. FLETCHER, JR.
Attesting Officer

ROBERT GOTTSCHALK
Commissioner of Patents